US012697623B2

(12) United States Patent      (10) Patent No.:    US 12,697,623 B2

Sato                     (45) Date of Patent:        Aug. 4, 2026

(54) METAL COLLECTOR AND USE OF IT

(71) Applicant: Prime Planet Energy & Solutions, Inc., Tokyo (JP)

(72) Inventor: Tetsuya Sato, Kobe (JP)

(73) Assignee: PRIME PLANET ENERGY & SOLUTIONS, INC., Tokyo (JP)

( * ) Notice: Subject to any disclaimer, the term of this patent is extended or adjusted under 35 U.S.C. 154(b) by 0 days.

(21) Appl. No.: 18/948,376

(22) Filed: Nov. 14, 2024

(65) Prior Publication Data

US 2025/0161956 A1     May 22, 2025

(30) Foreign Application Priority Data

Nov. 16, 2023    (JP) ................................. 2023-195091

(51) Int. Cl.
    *B03C 1/033*        (2006.01)
    *F16L 55/00*       (2006.01)

(52) U.S. Cl.
    CPC .............. *B03C 1/033* (2013.01); *F16L 55/00* (2013.01); *B03C 2201/18* (2013.01); *B03C 2201/22* (2013.01)

(58) Field of Classification Search
    CPC .... B03C 1/0332; B03C 1/288; B03C 2201/18
    USPC ................................. 209/213, 214
    See application file for complete search history.

(56) References Cited

U.S. PATENT DOCUMENTS

| | | | | | |
|---|---|---|---|---|---|
| 2,652,925 | A | * | 9/1953 | Vermeiren | .............. B21C 37/00 204/DIG. 5 |
| 5,161,512 | A | * | 11/1992 | Adam | ..................... C02F 1/482 123/538 |

| | | | | | |
|---|---|---|---|---|---|
| 5,466,574 | A | * | 11/1995 | Liberti | .................... B03C 1/035 435/7.5 |
| 6,277,275 | B1 | * | 8/2001 | Yoshifusa | ............... C02F 1/482 210/232 |
| 10,468,662 | B2 | * | 11/2019 | Hirai | ................... H01M 10/058 |
| 2001/0013491 | A1 | * | 8/2001 | Kaske | ...................... B03C 1/28 210/222 |

FOREIGN PATENT DOCUMENTS

| | | | | |
|---|---|---|---|---|
| JP | 2004223333 | A | * 8/2004 | .............. B03C 1/00 |
| JP | 2006-341202 | A | 12/2006 | |
| JP | 2012-186113 | A | 9/2012 | |

OTHER PUBLICATIONS

Kodama; Kiyoyuki, "Magnetic Impurity Filter" (English Translation), Aug. 12, 2004, worldwide.espacenet.com (Year: 2004).*

* cited by examiner

*Primary Examiner* — Molly K Devine

(74) *Attorney, Agent, or Firm* — HAUPTMAN HAM, LLP

(57)             ABSTRACT

A metal collector for a pipeline disclosed herein includes: a first magnet arranged on an outer surface of a pipeline in a state where a N pole is directed toward an inner side of the pipeline and a S pole is directed toward an outer side; a second magnet arranged on another part of the outer surface of the pipeline in a state where a S pole is directed toward the inner side and a N pole is directed toward the outer side; a magnetic circuit forming member that is a ferromagnetic material connected to the S pole of the first magnet and the N pole of the second magnet. The metal collector can remove the metal foreign substance from the fluid inside the pipeline.

11 Claims, 6 Drawing Sheets

METAL COLLECTOR AND USE OF IT

CROSS REFERENCE TO RELATED APPLICATIONS

The present application claims the priority based on Japanese Patent Application No. 2023-195091 filed on Nov. 16, 2023, and the entire contents of the prior application are incorporated in the present specification by reference.

BACKGROUND

1. Technical Field

The present disclosure relates to a metal collector, and various apparatuses in which this metal collector is used.

2. Description of the Related Art

An electrode plate of an electric storage device, such as lithium ion secondary battery, is formed by, for example, applying an active material paste to coat a surface of a foil-shaped electrode core body. Regarding this manufacturing step for this electrode plate, it might happen to occur a contamination of a metal foreign substance in the active material paste. With respect to this matter, various techniques for removing the metal foreign substance from the active material paste while being transferred in a pipeline are proposed.

For example, an active material paste for secondary battery manufacturing apparatus described in Japanese Patent Application Publication No. 2012-186113 includes a kneading unit, which has a kneading container that accommodates a material for an electrode active material paste, which has a stirring blade that is rotated in the kneading container to knead the material for the electrode active material paste, and in which at least a part of the kneading container and the stirring blade is made by a magnetic material, includes a circulation pathway which is provided at an outside of the kneading container and whose both ends are communicated to an inside of the kneading container, includes a capturing unit which is arranged in the circulation pathway and which captures a magnetic foreign substance by a magnetic force, and includes a pump which takes the material for the electrode active material paste during kneading from the kneading container into the circulation pathway and which makes it pass through the capturing unit. This cited document describes that it is possible by the above described configuration to efficiently capture the magnetic metal foreign substance.

In addition, a magnetic separation apparatus described in Japanese Patent Application Publication No. 2006-341202 includes a pipeline which is made from a nonmagnetic material, and includes magnets which collect a magnetic foreign substance in a processed fluid flowing inside the pipeline and which are opposed to sandwich the pipeline. Then, this magnetic separation apparatus includes plate-shaped projections on side walls at a magnet side inside the pipeline, and the projections are disposed alternately on the side walls being opposed to each other inside the pipeline. This cited document describes that it is possible by the above described configuration to provide the magnetic separation apparatus in which a collection ability for the magnetic foreign substance is enhanced.

SUMMARY

Anyway, recently, a request for a performance of the electric storage device is increased further. Thus, it is required to further efficiently remove the metal foreign substance from the active material paste while being transferred, so as to stably provide the high-quality active material paste for manufacturing the electrode plate.

For the matters described above, a metal collector including a configuration described below is provided.

The metal collector disclosed herein is a metal collector for a pipeline. The metal collector includes a first magnet arranged on a part of an outer periphery surface of the pipeline in a state where a N pole is directed toward a diameter direction inner side of the pipeline and a S pole is directed toward a diameter direction outer side of the pipeline. And, the metal collector includes a second magnet arranged on another part of the outer periphery surface of the pipeline in a state where a S pole is directed toward the diameter direction inner side and a N pole is directed toward the diameter direction outer side. Furthermore, the metal collector includes a magnetic circuit forming member that is a ferromagnetic material connected to the S pole of the first magnet and the N pole of the second magnet.

In the metal collector having the configuration described above, through the magnetic circuit forming member being the ferromagnetic material, the first magnet and the second magnet are connected. By doing this, a ring-shaped magnetic circuit is formed to connect the first magnet, the second magnet, and the magnetic circuit forming member. Then, regarding this metal collector, the first magnet is arranged in a state where a N pole is directed toward a diameter direction inner side of the pipeline, and the second magnet is arranged in a state where a S pole is directed toward the diameter direction inner side of the pipeline. By doing this, it is possible to act the magnetism even at a position near the center of the pipeline through which the fluid, such as active material paste, passes, and thus it is possible to efficiently remove the metal foreign substance.

DETAILED DESCRIPTION

Below, an embodiment of the herein disclosed technique would be explained, while referring to drawings. Incidentally, the matters other than matters particularly mentioned in this specification, and required for practicing the present disclosure can be grasped as design matters of those skilled in the art based on the related art in the present field. The herein disclosed technique can be executed based on the contents disclosed in the present specification, and on the technical common sense in the present field.

Incidentally, a term "electric storage device" in the present specification represents a concept semantically covering an apparatus in which, by moving an electric charge carrier between a pair of electrodes (a positive electrode and a negative electrode), a electric charge and discharge response is generated. In other words, the electric storage device of the herein disclosed technique semantically covers not only a secondary battery, such as lithium ion secondary battery, nickel hydrogen battery, and nickel cadmium battery, but also a capacitor, such as lithium ion capacitor and electric double layer capacitor, or the like.

First Embodiment

1. Metal Collecting Device

Figure 1:
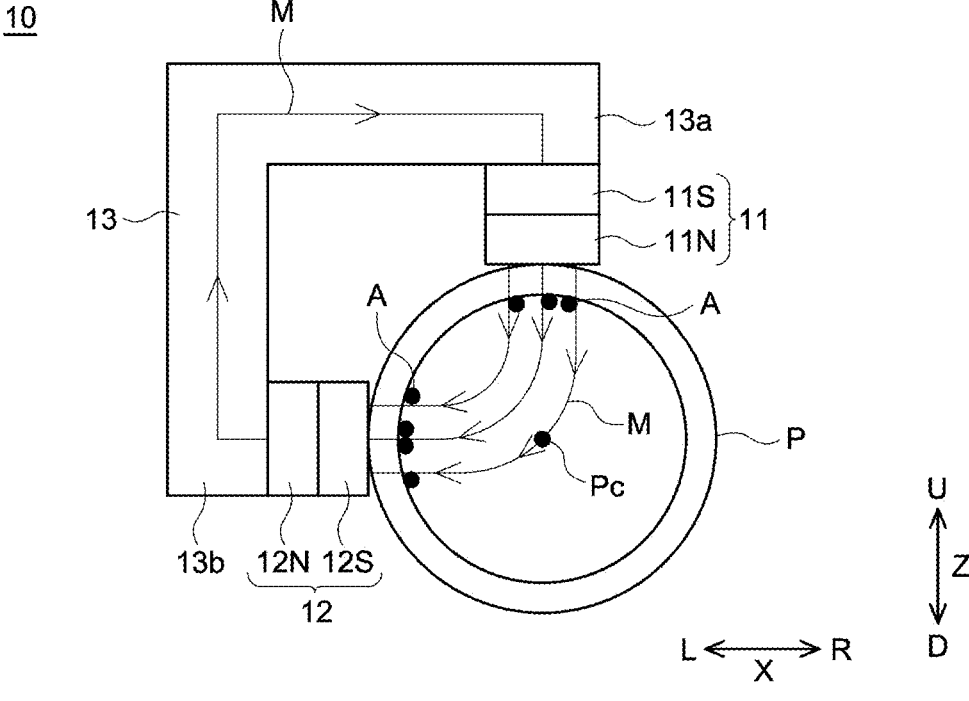
FIG. 1 is a cross section view that schematically shows a metal collector in accordance with a first embodiment.

Below, an embodiment of the metal collector disclosed herein will be described. FIG. 1 is a cross section view that schematically shows the metal collector in accordance with a first embodiment. Incidentally, reference signs L, R, F, Rr, U, and D in drawings referred by the present specification are to respectively represent left, right, front, rear, up, and down. In addition, reference signs X, Y, and Z are to respectively represent a width direction, a depth direction, and a height direction. However, these are merely directions defined for convenience sake of explanation, and are not to restrict use aspects of the metal collector and a metal collecting apparatus for pipeline disclosed herein.

As shown in FIG. 1, a metal collector 10 in accordance with the present embodiment includes a first magnet 11 that is arranged at a part of an outer periphery surface of a pipeline P, in a state where a N pole 11N is directed toward a diameter direction inner side of the pipeline P and a S pole 11S is directed toward a diameter direction outer side of the pipeline, includes a second magnet 12 that is arranged at another part of the outer periphery surface of the pipeline P, in a state where a S pole 12S is directed toward the diameter direction inner side and a N pole 12N is directed toward the diameter direction outer side, and includes a magnetic circuit forming member 13 that is made from a ferromagnetic material and is connected to the S pole 11S of the first magnet 11 and the N pole 12N of the second magnet 12. According to the metal collector 10 having the configuration described above, it is possible to efficiently remove a metal foreign substance A from a fluid flowing in the pipeline P. Below, it will be explained, particularly.

(1) First Magnet 11

The first magnet 11 is a magnet arranged at a part of the outer periphery surface of the pipeline P, in a state where the N pole 11N is directed toward the diameter direction inner side of the pipeline P and the S pole 11S is directed toward the diameter direction outer side of the pipeline. In a form shown by FIG. 1, the first magnet 11 is a member whose cross section is rectangular. This first magnet 11 is, in the cross section view, arranged at an upward U of the pipeline P. Then, the N pole 11N of the first magnet 11 is directed toward a downward D side. By doing this, the N pole 11N of the first magnet 11 comes into contact with the outer periphery surface of the pipeline P at a position of 0 o'clock) (0°) in a circumferential direction. On the other hand, the S pole 11S of the first magnet 11 is directed toward the upward U side. Although more details are described later, the S pole 11S of this first magnet 11 is connected to the magnetic circuit forming member 13.

Incidentally, as for the first magnet 11, it is possible without particular restriction to use a conventionally known magnet, such as permanent magnet and electromagnet. As the permanent magnet, it is possible to use a neodymium magnet, a ferrite magnet, a samarium cobalt magnet, an alnico magnet, a bond magnet, or the like. A magnetic force of the first magnet 11 is preferably equal to or more than 2000 gauss, further preferably equal to or more than 3000 gauss, furthermore preferably equal to or more than 4000 gauss, or preferably in particular equal to or more than 5000 gauss. By doing this, it is possible to suitably collect the metal foreign substance A in the pipeline P. On the other hand, if the magnetic force becomes too stronger, there is a fear that, by a repellent force of the first magnet 11 and the second magnet 12, an adhesion portion of the first magnet 11 (or the second magnet 12) and the magnetic circuit forming member 13 is peeled off. From a perspective described above, the magnetic force of the first magnet 11 is preferably equal to or less than 18000 gauss, further preferably equal to or less than 17000 gauss, furthermore preferably equal to or less than 16000 gauss, or preferably in particular equal to or less than 15000 gauss. In addition, it is independently required, for making the magnetic force of the first magnet 11 be more than 15000 gauss, to provide a circuit for concentrating magnetic force lines, and thus it might cause increasing a component cost or complicating a structure.

(2) Second Magnet 12

The second magnet 12 is a magnet arranged at another part of the outer periphery surface of the pipeline P, in a state where the S pole 12S is directed toward the diameter direction inner side and the N pole 12N is directed toward the diameter direction outer side. The second magnet 12 is arranged so as to make the magnetism poles, coming into contact with the pipeline P, be reversed with respect to the magnetism pole of the first magnet 11. In the present embodiment, the second magnet 12 is a member whose cross section is rectangular. The second magnet 12 is arranged at a left-side L of the pipeline P. Then, the S pole 12S of the second magnet 12 is directed toward a right-side R side. By doing this, the S pole 12S of the second magnet 12 comes into contact with the outer periphery surface of the pipeline P at a position of 9 o'clock) (270° in the circumferential direction. On the other hand, the N pole 12N of the second magnet 12 is arranged at the left-side L side. The N pole 12N of this second magnet 12 is connected to the magnetic circuit forming member 13. Incidentally, as the second magnet 12, similarly to the first magnet 11, it is possible without particular restriction to use a conventionally known magnet, and thus an overlapped explanation is omitted. In addition, the magnetic force of the first magnet 11 and the magnetic force of the second magnet 12 might be the same or might be the different to each other. However, if the same kind of magnet is used for the first magnet 11 and for the second magnet 12, it is possible to reduce a component procurement cost. In addition, if the magnetic force of the first magnet 11 and the magnetic force of the second magnet 12 are significantly different from each other, there is a fear that a metal collecting performance is reduced, too. From these perspectives, it is preferable that the magnetic force of the first magnet 11 and the magnetic force of the second magnet 12 are in a similar extent. Incidentally, the wording "similar extent" herein means that, if the magnetic force of the first magnet 11 is treated as 100%, the magnetic force of the second magnet 12 is 80% to 120% (suitably, 90% to 110%, further suitably 95% to 105%, or suitably in particular 99% to 101%).

(3) Magnetic Circuit Forming Member 13

The magnetic circuit forming member 13 is a member which is made from the ferromagnetic material and which is connected to the S pole 11S of the first magnet 11 and the N pole 12N of the second magnet 12. Regarding a form shown by FIG. 1, the magnetic circuit forming member 13 is a member formed in a letter "L" shape. Then, to an end part 13a at one side (the upward U) of the magnetic circuit forming member 13, the S pole 11S of the first magnet 11 is connected. In addition, to an end part 13b at the other side (the downward D) of the magnetic circuit forming member 13, the N pole 12N of the second magnet 12 is connected. Incidentally, a boundary between the first magnet 11 (or the second magnet 12) and the magnetic circuit forming member 13 is adhered by a binding agent, or the like.

In addition, as described above, the magnetic circuit forming member 13 is a ferromagnetic material. In particular, a relative permeability of the magnetic circuit forming member 13 is preferably equal to or more than 100 $\mu/\mu 0$, further preferably equal to or more than 500 $\mu/\mu 0$, furthermore preferably equal to or more than 1000 $\mu/\mu 0$, or preferably in particular equal to or more than 2500 $\mu/\mu 0$. By doing this, it is possible to properly generate a ring-shaped magnetic circuit M via the magnetic circuit forming member 13. On the other hand, an upper limit of the relative permeability of the magnetic circuit forming member 13, which is not particularly restricted, might be equal to or less than 10000 $\mu/\mu 0$, or might be equal to or less than 7500 $\mu/\mu 0$. Incidentally, the term "relative permeability ($\mu/\mu 0$)" in the present specification represents a ratio of a permeability ($\mu$) of a substance in a case where a permeability ($\mu 0$) under a vacuum state is used as a reference. In addition, as a particular material of the magnetic circuit forming member 13, it is possible to use a metal, such as iron, iron cobalt alloy, silicon steel, and permalloy.

As described above, to the metal collector 10 in accordance with the present embodiment, the first magnet 11 and the second magnet 12 are connected via the magnetic circuit forming member 13 being the ferromagnetic material. By doing this, the ring-shaped magnetic circuit M is formed so as to connect the first magnet 11, the second magnet 12, and the magnetic circuit forming member 13. Furthermore, in this metal collector 10, the first magnet 11 is arranged in a state where the N pole 11N is directed toward the diameter direction inner side of the pipeline P, and the second magnet 12 is arranged in a state where the S pole 12S is directed toward the diameter direction inner side of the pipeline P. Thus, the ring-shaped magnetic circuit M generates, as shown in FIG. 1, the magnetism inside the pipeline P which is to connect the N pole 11N of the first magnet 11 and the S pole 12S of the second magnet 12. As this result, in the pipeline P, the magnetism acts not only on a peripheral area where the first magnet 11 and the second magnet 12 are pressed, but also on a position near a center of the pipeline P along the magnetic circuit M.

The metal foreign substance A in the fluid flowing inside the pipeline P is attracted to the inner side surface of the pipeline P by the magnetism generated inside the pipeline P along the magnetic circuit M. In addition, near the inner side surface of the pipeline P, the metal foreign substance A is captured by the inner side surface of the pipeline P. As described above, according to the metal collector 10 in accordance with the present embodiment, the magnetism acts even at the position near the center of the pipeline P, although the first magnet 11 and the second magnet 12 are arranged at the outer side of the pipeline P. As this result, it is possible to suitably capture the metal foreign substance A in the fluid flowing inside the pipeline P. The captured metal foreign substance A stays on the inner side surface of the pipeline P in a state of being attracted by the first magnet 11 and the second magnet 12. Thus, it is possible to efficiently remove the metal foreign substance A from the fluid flowing inside the pipeline P.

In addition, as the illustration is omitted, it is preferable that the metal collector 10 further includes a fixing tool configured to fix the first magnet 11 and the second magnet 12 on the pipeline P, in a state where the N pole 11N of the first magnet 11 and the S pole 12S of the second magnet 12 are directed toward the diameter direction inner side. By doing this, it is possible to stably generate the magnetic circuit M inside the pipeline P, and thus it is possible to furthermore enhance the collection efficiency of the metal foreign substance A. Incidentally, a specific example of this fixing tool would be described later.

2. Metal Collecting Apparatus for Pipeline 100

Figure 2:
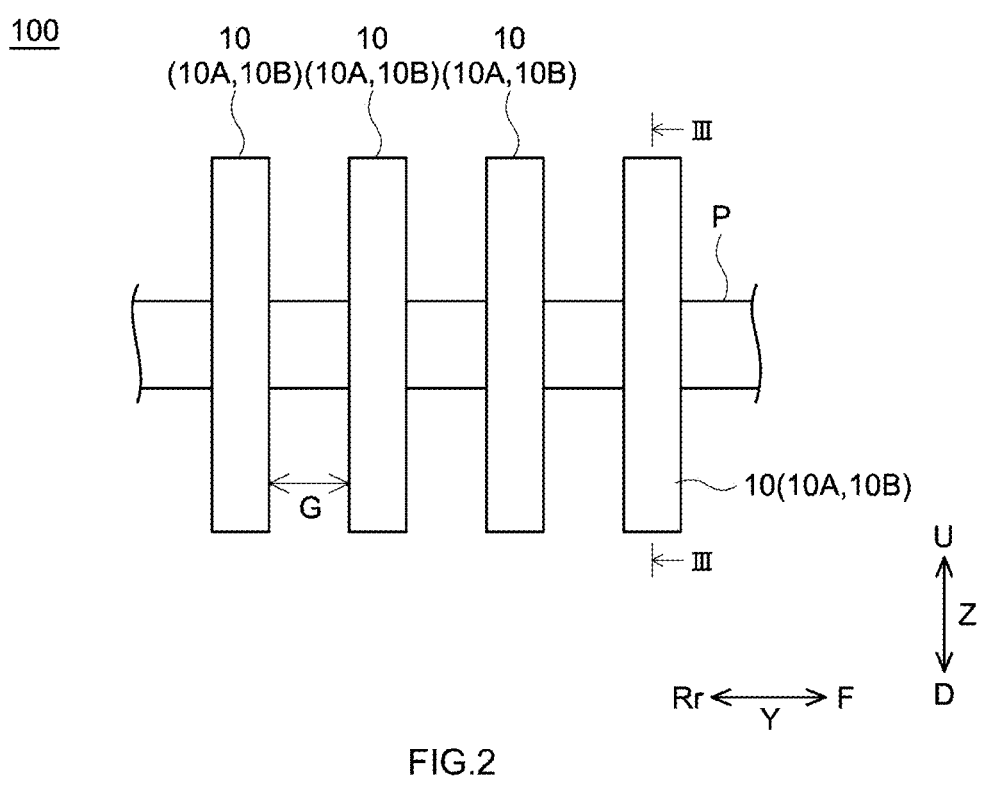
FIG. 2 is a side view that schematically shows a metal collecting apparatus for pipeline in accordance with the first embodiment.
Figure 3:
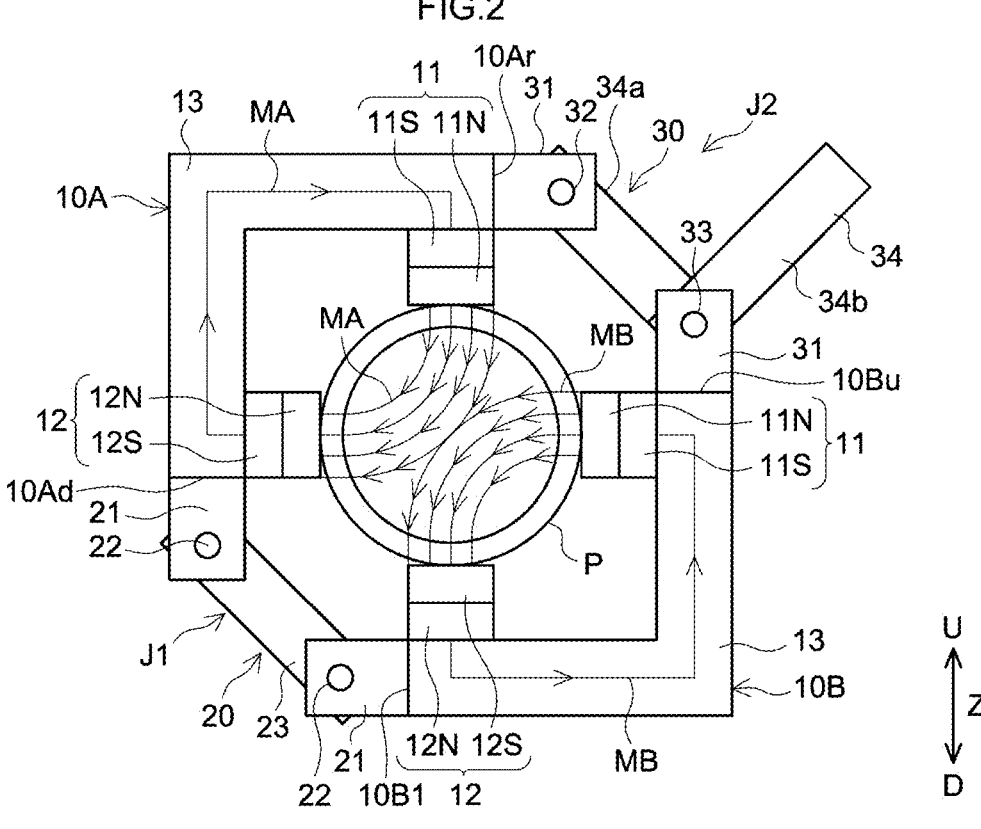
FIG. 3 is a cross section view that schematically shows the metal collecting apparatus for pipeline in accordance with the first embodiment.
Figure 4:
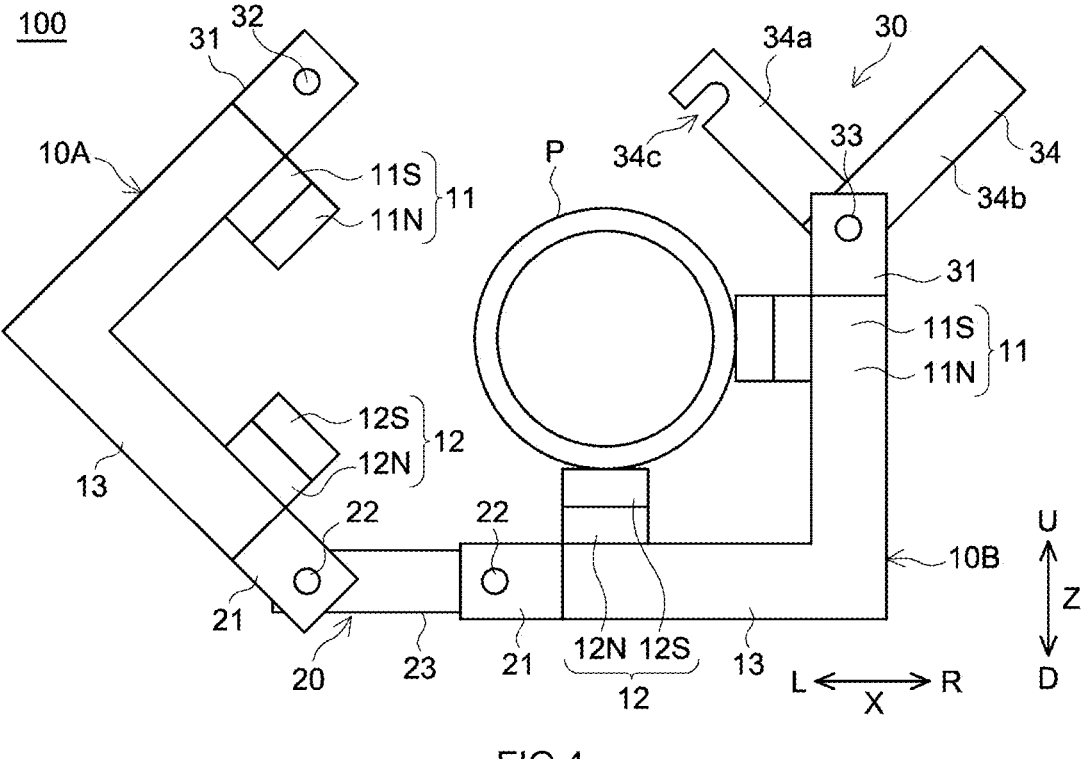
FIG. 4 is a cross section view that is to explain an operation when the metal collecting apparatus for pipeline in accordance with the first embodiment is attached to a pipeline.

Next, a metal collecting apparatus for pipeline (hereinafter, it is referred to as simply "metal collecting apparatus", too) 100 including plural metal collectors 10 each having the above described configuration will be described. FIG. 2 is a side view that schematically shows the metal collecting apparatus for pipeline in accordance with the first embodiment. FIG. 3 is a cross section view that schematically shows the metal collecting apparatus for pipeline in accordance with the first embodiment. FIG. 4 is a cross section view that is for explaining attachment of the metal collecting apparatus for pipeline in accordance with the first embodiment.

(1) Arrangement of Metal Collector 10

As shown in FIG. 2, regarding the metal collecting apparatus 100 in accordance with the present embodiment, the plural metal collectors 10 are arranged along a length direction of the pipeline P (in other words, a depth direction Y), while a gap G is kept between them. By doing this, it is possible to gradually collect the metal foreign substance at each stage in the length direction of the pipeline P, and thus it is possible to furthermore improve the collection efficiency. Regarding the metal collecting apparatus 100 shown in FIG. 2, the plural metal collectors 10 are independently attached at respective attachment positions on the pipeline P. In accordance with such a configuration, it is possible to easily increase or decrease an attachment number of the metal collectors 10 as needed. Incidentally, in FIG. 2, the metal collectors 10 are attached at 4 points on the pipeline P. However, the number of the arrangement positions of the metal collectors 10 in the length direction of the pipeline P, which is not particularly restricted, could be suitably increased or decreased in consideration of a size (a length, a diameter, or the like) of the pipeline P, a size of the metal foreign substance A, or the like.

Incidentally, the gap G between the 2 metal collectors 10 arranged adjacent in the depth direction Y is preferably equal to or less than 30 mm, further preferably equal to or less than 25 mm, furthermore preferably equal to or less than 20 mm, or preferably in particular equal to or less than 17.5 mm. As the gap G between the metal collectors 10 becomes shorter, it becomes easier to form the magnetic field continuous in the length direction (the depth direction Y) of the pipeline P. By doing this, it is possible to implement an effect for making the metal foreign substance A become easily moved on the inner wall of the pipeline P. On the other hand, a lower limit value of the gap G between the metal collectors 10 is preferably equal to or more than 2 mm, further preferably equal to or more than 5 mm, further preferably equal to or more than 10 mm, or preferably in particular equal to or more than 12.5 mm. As the gap G between the metal collectors 10 becomes longer, it becomes easier to release the magnetic field of the adjacent metal collectors 10, and thus it is possible to contribute in enhancing a workability.

Next, regarding the metal collecting apparatus 100 in accordance with the present embodiment, even numbers of metal collectors 10 are arranged on a virtual flat surface crossing an axis line of the pipeline P (the depth direction Y in FIG. 2). FIG. 3 being a III-III cross section view of FIG. 2 represents the virtual flat surface crossing the axis line of the pipeline P. As shown in FIG. 3, regarding the metal collecting apparatus 100 in accordance with the present embodiment, the 2 metal collectors 10A, 10B are arranged at one arrangement position in the length direction of the pipeline P. In explanation described below, the metal collector 10A arranged at upper left in FIG. 3 is referred to as "first metal collector 10A", and the metal collector 10B arranged at lower right is referred to as "second metal collector 10B".

Regarding each of the even numbers (2) of metal collectors 10A, 10B in the present embodiment, in a circumferential direction of the pipeline P, the first magnet 11 of the first metal collector 10A and the first magnet 11 of the second metal collector 10B are arranged to be adjacent to each other and the second magnet 12 of the first metal collector 10A and the second magnet 12 of the second metal collector 10B are arranged to be adjacent to each other.

Regarding a form shown by FIG. 3, the first magnet 11 of the first metal collector 10A is arranged at the position of 0 o'clock) (0°)in the circumferential direction, under a state where the N pole 11N is directed toward the diameter direction inner side. The second magnet 12 of the first metal collector 10A is arranged at a position of 9 o'clock) (270°) in the circumferential direction, under a state where the S pole 12S is directed toward the diameter direction inner side. By doing this, a first magnetic force circuit MA is generated that is directed from the position of 0 o'clock toward the position of 9 o'clock in the circumferential direction. On the other hand, the first magnet 11 of the second metal collector 10B is arranged at a position of 3 o'clock) (90° in the circumferential direction, under a state where the N pole 11N is directed toward the diameter direction inner side. The second magnet 12 of the second metal collector 10B is arranged at a position of 6 o'clock) (180°) in the circumferential direction, under a state where the S pole 12S is directed toward the diameter direction inner side. By doing this, a second magnetic force circuit MB is generated that is directed from the position of 3 o'clock toward the position of 6 o'clock in the circumferential direction.

As described above, the first metal collector 10A and the second metal collector 10B are arranged to make the N poles 11N be arranged to be adjacent in the circumferential direction and to make the S poles 12S be arranged to be adjacent in the circumferential direction. By doing this, it is possible to make a direction of the first magnetic force circuit MA and a direction of the second magnetic force circuit MB be the same. As this result, it becomes easy, without offsetting two magnetic force circuits MA, MB, to act the magnetism over a whole area inside the pipeline P. Accordingly, by arranging the 2 metal collectors 10A, 10B as described above, it becomes easy to act the magnetism not only on a periphery of the first magnet 11 or of the second magnet 12, but also to a vicinity of a center $P_C$ of the pipeline P, and thus it is possible to furthermore enhance the collection efficiency of the metal foreign substance A.

(2) Fixing Tool

Next, the metal collecting apparatus 100 in accordance with the present embodiment includes a fixing tool configured to fix the metal collectors 10A, 10B on the pipeline P. This fixing tool is configured to fix each first magnet 11 and second magnet 12 of the even numbers of metal collectors 10A, 10B on the pipeline P, in a state where the N pole 11N of the first magnet 11 and the S pole 12S of the second magnet 12 are directed toward the diameter direction inner side. By doing this, it is possible to stably act the magnetism at the inside of the pipeline P, and thus it is possible to further enhance the collection efficiency for the metal foreign substance.

Below, a particular structure of the fixing tool in the present embodiment will be explained. Incidentally, the metal collecting apparatus 100 including the plural metal collectors happens to include plural coupling points J1, J2 produced by the metal collectors 10A, 10B being adjacent in the circumferential direction. For example, in the metal collecting apparatus 100 shown by FIG. 3, a first coupling point J1 is produced between a lower end part 10Ad of the first metal collector 10A and a left end part 10Bl of the second metal collector 10B. On the other hand, a second coupling point J2 is produced between a right end part 10Ar of the first metal collector 10A and a top end part 10Bu of the second metal collector 10B. The fixing tool in the present embodiment includes a rotationally moving member 20 that is configured to couple the first coupling point J1, and include a locking member 30 that is configured to couple the second coupling point J2.

(2-a) Rotationally Moving Member 20

The rotationally moving member 20 is configured to couple the adjacent metal collectors 10A, 10B to each other along a virtual flat surface in a rotatable manner, at the coupling point J1 among the plural coupling points J1, J2, from which at least one coupling point J2 is excluded. The rotationally moving member 20 is configured to couple the coupling point JI positioned between the lower end part 10Ad of the first metal collector 10A and the left end part 10Bl of the second metal collector 10B in the rotatable manner. Here, the rotationally moving member 20 shown in FIG. 3 and FIG. 4 includes a supporting part 21, a rotating axis 22, and a cross-linking part 23. The supporting part 21 is attached to each of 2 metal collectors 10A, 10B. One of the supporting parts 21 is configured to extend from the lower end part 10Ad of the first metal collector 10A to a downward D. The other one of the supporting parts 21 is configured to extend from the left end part 10Bl of the second metal collector 10B to a left-side L. The cross-linking part 23 is a plate-shaped member configured to cross-link the above described two supporting parts 21. The rotating axis 22 is an axis body configured to connect the cross-linking part 23 and the supporting part 21 in a rotatable manner. In further particular, the supporting part 21 is configured with a pair of plate-shaped members (omitted in drawings) being opposed to each other in the depth direction Y (a vertical direction with respect to a paper surface of FIG. 3). Then, opposite ends of the cross-linking part 23 are interposed between the pair of plate-shaped members configuring the supporting part 21. In addition, the rotating axis 22 is configured to penetrate the supporting part 21 and the cross-linking part 23. By doing this, it is possible with the two rotating axes 22 acting as centers to rotationally move respective metal collectors 10A, 10B.

(2-b) Locking Member 30

The locking member 30 is configured to couple the adjacent metal collectors 10A, 10B in a detachable manner, at the coupling point J2 which is not coupled by a rotationally moving member. In the present embodiment, the locking member 30 is a member configured to lock the right end part 10Ar of the first metal collector 10A and the top end part 10Bu of the second metal collector 10B. By doing this, it is possible to couple the coupling point J2. Then, the locking member 30 is configured to be able to suitably release the locking state of the two metal collectors 10A, 10B. Here, as shown in FIG. 3 and FIG. 4, the locking member 30 includes a supporting part 31, a locking axis 32, a rotating axis 33, and a cross-linking part 34.

The supporting part 31 of the locking member 30 is, similarly to the supporting part 21 of the rotationally moving member 20 described above, a member attached to each of the metal collectors 10A, 10B. One of the supporting parts 31 is configured to extend from the right end part 10Ar of the first metal collector 10A to a right-side R. The other one of the supporting parts 31 is configured to extend from the top end part 10Bu of the second metal collector 10B to an upward U. The locking axis 32 is provided on a tip end of the supporting part 31 at the first metal collector 10A side (see FIG. 4). The cross-linking part 34 of the locking member 30 is a member formed in a letter "L" shape. This cross-linking part 34 includes a body 34a configured to connect the two supporting parts 31 and includes a holding part 34b configured to be held by an operator for an operation. At a boundary portion (a corner part of the cross-linking part 34 formed in the letter "L" shape) between the body 34a and the holding part 34b, the rotating axis 33 is attached. The rotating axis 33 is configured to penetrate the supporting part 31 at the second metal collector 10B side and the corner part of the cross-linking part 34. The cross-linking part 34 is configured to rotate about the rotating axis 33 being as the center. At the tip end of the body 34a of the cross-linking part 34, a notch part 34c is provided. The notch part 34c is formed to engage with the locking axis 32.

Below, it will be described about a procedure for fixing the metal collectors 10A, 10B on the pipeline P with the fixing tool including the above described configuration. At first, as shown in FIG. 4, the first magnet 11 and second magnet 12 of the second metal collector 10B are made to come into contact with the outer periphery surface of the pipeline P. In this state, by making the first metal collector 10A rotate about the rotationally moving member 20 being as the center, the first metal collector 10A is made to move be closer to the pipeline P. Here, the adjacent metal collectors 10A, 10B are arranged to make the respective N poles 11N be adjacent to each other and the respective S poles 12S be adjacent to each other in the circumferential direction of the pipeline P. As this result, between the plural metal collectors 10A, 10B, it is possible to act the magnetic force which is to make the adjacent magnets repel to each other. According to the repellent described above, one of the metal collectors 10A, 10B can be flipped to the diameter direction outer side.

Therefore, the operator using the metal collecting apparatus 100 in accordance with the present embodiment makes, to suppress this repellent, the first metal collector 10A come into contact with the outer periphery surface of the pipeline P. Then, while keeping this state, the cross-linking part 34 of the locking member 30 is made to rotate, so as to make the notch part 34c and the locking axis 32 be engaged. By doing this, it is possible to firmly fix the plural metal collectors 10A, 10B that mutually repel on the pipeline P. Then, this metal collecting apparatus 100 can be easily removed from the pipeline P, merely by holding the holding part 34b and then rotating the cross-linking part 34. As described above, according to the fixing tool having the configuration described above, it is possible to easily implement attachment on and detachment from the pipeline P, regarding even the metal collecting apparatus 100 in which both of the metal collectors 10A, 10B are constructed to repel mutually. As this result, it can be very easy to implement increasingly providing or removing the metal collectors.

Incidentally, it is preferable that a configuration member of the fixing tool (particularly, the cross-linking parts 23, 34) is a nonmagnetic body. By doing this, it is possible to inhibit the magnetic force circuits of plural metal collectors 10A, 10B from being connected through the fixing tool. In addition, it is preferable that the fixing tool is a member having a predetermined rigidity. In the present embodiment, As shown in FIG. 3, the metal collectors 10A, 10B are firmly fixed by the fixing tool that has a predetermined rigidity. Thus, even if the adjacent magnets of the plural metal collectors 10A, 10B repel mutually, it is possible to suitably suppress this repellent. From these perspectives, it is preferable that the cross-linking parts 23, 34 are nonmagnetic bodies and are configured with resin materials having necessary rigidities. As one example of the resin materials as described above, it is possible to use polyamide, poly carbonate, polyacetal, polybutylene terephthalate, modified polyphenylene ether, or the like.

As described above, the metal collecting apparatus 100 in accordance with the present embodiment includes the first metal collector 10A and the second metal collector 10B which are arranged to make directions of respective magnetic force circuits MA, MB be the same. These first metal collector 10A and second metal collector 10B are firmly fixed on the pipeline P by the fixing tool. By doing this, it is possible to act the strong magnetism over the whole area of the pipeline P in the cross section view, and thus it is possible to further efficiently collect the metal foreign substance A.

3. Manufacturing Apparatus of Electric Storage Device

Figure 5:
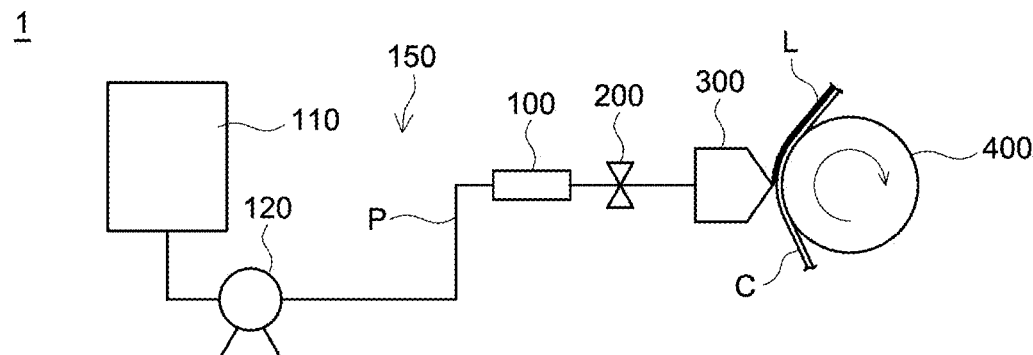
FIG. 5 is a view that schematically shows a manufacturing apparatus for an electric storage device in accordance with the first embodiment.

Next, it will be described about a manufacturing apparatus of the electric storage device that includes the metal collecting apparatus 100 having the above described configuration (hereinafter, which is simply referred to as "manufacturing apparatus", too). FIG. 5 is a view that schematically shows the manufacturing apparatus of the electric storage device in accordance with the first embodiment. As shown in FIG. 5, the manufacturing apparatus 1 in accordance with the present embodiment includes a fluid transferring device 150, a valve 200, a die head 300, and a backup roller 400. Below, each configuration will be described.

The fluid transferring device 150 includes the pipeline P in which the fluid passes through, and includes the metal collecting apparatus 100 having the above described configuration. Furthermore, the fluid transferring device 150 in the present embodiment includes a tank 110 and a pump 120, too. The tank 110 is configured to store the transferred object (fluid). This tank 110 is connected through the pipeline P to the die head 300. Next, the pump 120 is provided between the tank 110 and the die head 300. This fluid transferring device 150 does, by operating the pump 120, transfer the fluid inside the tank 110 to the die head 300.

The fluid in the present embodiment is a slurry containing an electrode active material of the electric storage device. In particular, the slurry is a liquid in which an electrode material, such as electrode active material, is dispersed into a liquid medium. Incidentally, as the electrode active material, it is possible to use a positive electrode active material, such as lithium-transition metal complex oxide, and a negative electrode active material, such as carbon material. In addition, as the electrode material other than the electrode active material, it is possible to use an electrically conducting material, a binder, a thickening agent, or the like. However, the component in the slurry is not intended to restrict the herein disclosed technique, and thus a conventionally known component can be used without particular restriction.

Then, in the manufacturing apparatus 1 shown by FIG. 5, the die head 300 and the backup roller 400 are arranged to be opposed to each other. The backup roller 400 is a roller that is configured to carry an electrode core body C formed in a foil shape. Then, the die head 300 is a discharging device that is configured to discharge the slurry toward the electrode core body C on the backup roller 400. In accordance with such a configuration, it is possible to apply the slurry so as to coat a surface of the electrode core body C. Then, by drying this slurry, the electrode active material layer L is formed on the surface of the electrode core body C. In addition, between the pump 120 and the die head 300, the valve 200 is provided. Regarding the manufacturing apparatus 1 having the configuration described above, when the slurry coating is started, the valve 200 is opened and further the pump 120 is operated. On the other hand, when the slurry coating is stopped, the valve 200 is closed and further the pump 120 is stopped.

Here, regarding the manufacturing apparatus 1 in accordance with the present embodiment, the metal collecting apparatus 100 is attached on the pipeline P from the tank 110 to the die head 300. By doing this, it is possible to collect the metal foreign substance A at an upstream of the die head 300, and thus it is possible to apply the slurry, whose foreign substance contamination amount is low, to coat the electrode core body C. Thus, according to the manufacturing apparatus 1 in accordance with the present embodiment, it is possible to manufacture the high quality electrode.

Incidentally, among the configuration components of the manufacturing apparatus 1, a pressure feeding mechanism, such as pump 120, tends to cause the metal foreign substance by frictions of a metal member and another metal member. Thus, it is preferable that the metal collecting apparatus 100 is attached at a downstream more than the pump 120. By doing this, it is possible to suitably collect the metal foreign substance derived from the pressure feeding mechanism. Incidentally, it is preferable that the metal collecting apparatus 100 is arranged at the downstream side more than an equipment, which would cause the metal friction, regardless of the pressure feeding mechanism. As an example of such equipment, it is possible to care about a valve, such as 2-directions valve, 3-directions valve, and diaphragm valve. In addition, the metal foreign substance might be caused by abrasion when the high concentration slurry containing many granular materials passes through the pipeline P. In that case, the metal collecting apparatus 100 should be attached to various portions of the manufacturing apparatus 1, without restricting to a specific portion.

In addition, it is preferable that the metal collecting apparatus 100 is attached to the upstream more than the valve 200, because of the below described reason. As described above, this manufacturing apparatus 1 is configured to switch the start and stop of the slurry coating, by the open and close of the valve 200. However, the slurry for an electric storage device has a very high viscoelasticity. Thus, as a distance between the valve 200 and the die head 300 becomes longer, a time lag from an open state of the valve 200 to actual discharge of the slurry is caused more. The backup roller 400 transfers the electrode core body C continuously even during this time lag. Thus, as the above described time lag becomes longer, a yielding percentage at the manufacturing time is reduced. From the perspective, it is preferable that, while the metal collecting apparatus 100 is not disposed at the downstream of the valve 200, a distance between the valve 200 and the die head 300 is shorten as much as possible. By doing this, it is possible to shorten the time lag from the open state of the valve 200 to the discharge of the slurry.

Above, the first embodiment of the herein disclosed technique has been explained. Incidentally, the herein disclosed technique is not restricted to the above described first embodiment, and semantically covers another embodiment in which various configurations are changed. Below, another embodiment of the herein disclosed technique will be described.

Second Embodiment

Figure 6:
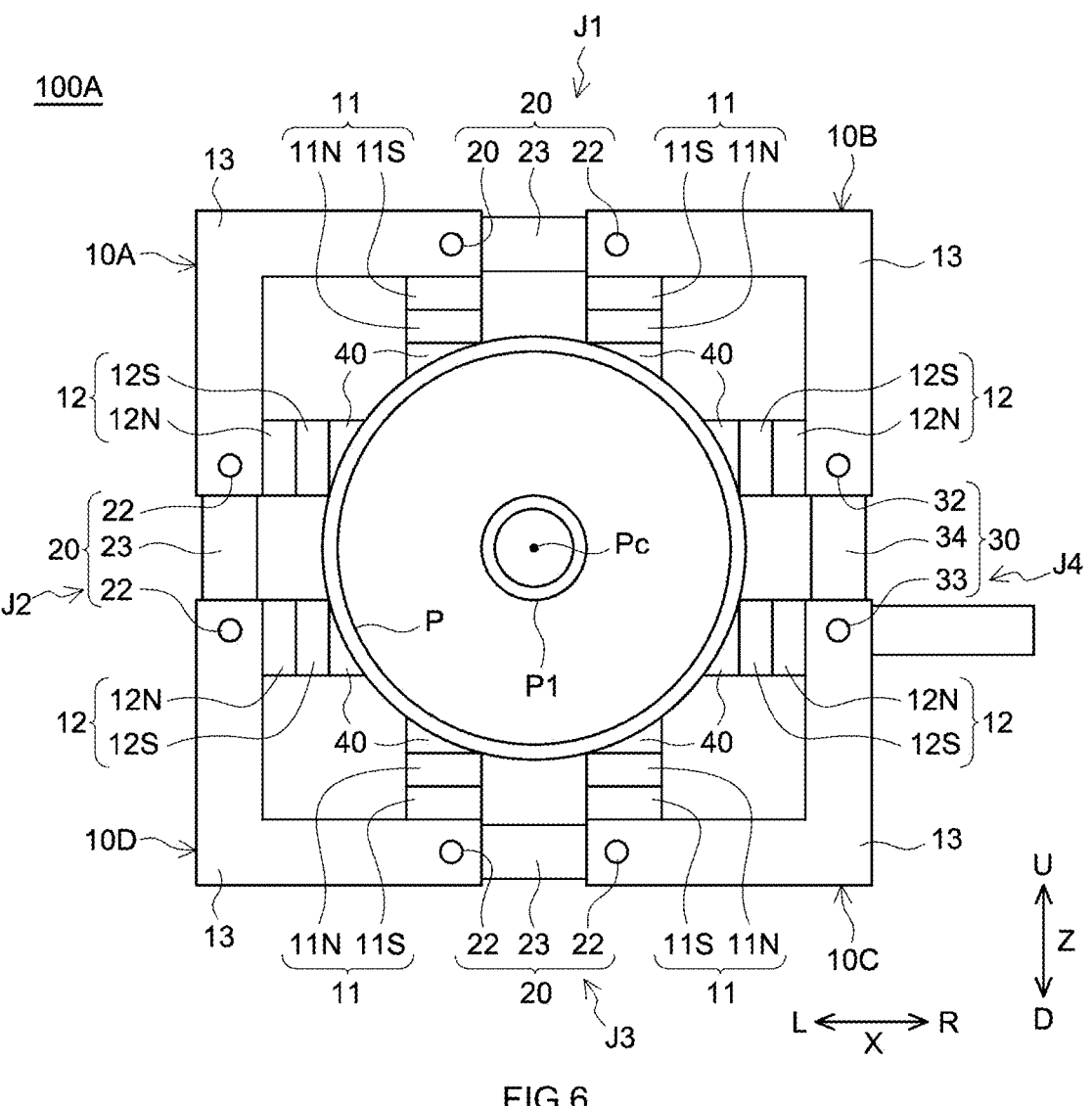
FIG. 6 is a cross section view that schematically shows the metal collecting apparatus for pipeline in accordance with a second embodiment.

FIG. 6 is a cross section view that schematically shows the metal collecting apparatus in accordance with the second embodiment. The metal collecting apparatus 100 in accordance with the first embodiment described above includes the 2 metal collectors 10A, 10B arranged on the same flat surface. However, in a case where the plural metal collectors are arranged on the same flat surface, the number of these metal collectors is not restricted to 2 if the number is even. For example, as shown in FIG. 6, the metal collecting apparatus 100A in accordance with the second embodiment includes 4 metal collectors 10A to 10D that are arranged on the same flat surface. By increasing the number of the metal collectors 10 arranged on the same flat surface, it becomes easy, even on the pipeline P whose diameter is large, to act the magnetism on a wide range inside the pipeline P, and thus it is possible to further enhance the collection efficiency for the metal foreign substance.

Then, even in the second embodiment, the plural metal collectors 10A to 10D are arranged to make the first magnet of an arbitrary metal collector and the first magnet of another metal collector be adjacent to each other, and to make the second magnet of the arbitrary metal collector and the second magnet of said another metal collector be adjacent to each other, in the circumferential direction of the pipeline P. In particular, the first magnet 11 of the first metal collector 10A in the second embodiment is adjacent to the first magnet 11 of the second metal collector 10B in a width direction X. The second magnet 12 of the second metal collector 10B is adjacent to the second magnet 12 of a third metal collector 10C in a height direction Z. The first magnet 11 of the third metal collector 10C is adjacent to the first magnet 11 of a fourth metal collector 10D in the width direction X. Then, the second magnet 12 of the fourth metal collector 10D is adjacent to the second magnet 12 of the first metal collector 10A in the height direction Z. As described above, the 4 metal collectors 10A to 10D are respectively arranged to make the first magnets 11 be adjacent to each other and to make the second magnets 12 be adjacent to each other. By doing this, it is possible to make the directions of the magnetic force circuits of all metal collectors 10A to 10D be the same. As this result, it is possible to inhibit the 4 magnetic force circuits from being offset, and thus it is possible to act the magnetism over the wide range inside the pipeline P.

In addition, the metal collecting apparatus 100 in accordance with the second embodiment includes 4 coupling points J1 to J4. Then, these coupling points J1 to J4 are coupled by the fixing tool. In particular, between the first metal collector 10A and the second metal collector 10B, the first coupling point J1 is produced. Between the second metal collector 10B and the third metal collector 10C, the second coupling point J2 is produced. In addition, between the third metal collector 10C and the fourth metal collector 10D, a third coupling point J3 is produced. In addition, between the fourth metal collector 10D and the first metal collector 10A, a fourth coupling point J4 is produced. Then, among these 4 coupling points J1 to J4, the coupling points J1 to J3 other than the fourth coupling point J4 are provided with the rotationally moving member 20. In addition, the fourth coupling point J4 not being coupled by the rotationally moving member 20 is provided with the locking member 30. Regarding the metal collecting apparatus 100 including the fixing tool having the configuration described above, by rotating the rotationally moving member 20, the first to fourth metal collectors 10A to 10D are arranged to be wound on the pipeline P. Then, by using the locking member 30 so as to engage the fourth coupling point J4, it is possible to fix the 4 metal collectors 10A to 10D on the pipeline P. As described above, according to the fixing tool including a structure shown in FIG. 6, it is possible even on the metal collecting apparatus 100A including the 4 metal collectors 10A to 10D to easily perform attachment on and detachment from the pipeline P.

Incidentally, in a case where 4 or more metal collectors are included as shown in the second embodiment, 2 or more locking members 30 might be provided. For example, the fixing tool shown by FIG. 6, as described above, only the fourth coupling point J4 is coupled by the locking member 30. However, one or more of the plural coupling points (for example, the second coupling point J2 and the fourth coupling point J4 in FIG. 6) might be coupled by the locking member. Even in that case, it is possible to easily attach and detach the plural metal collectors 10A to 10D.

In addition, regarding the second embodiment, between the N pole 11N of the first magnet 11 and the pipeline P and between the S pole 12S of the second magnet 12 and the pipeline P, filling members 40 are arranged, each of which is a magnetically permeable material including a curved surface 41 along the outer periphery surface of the pipeline P. By doing this, it is possible to sufficiently secure a contact area size produced by the outer periphery surface of the pipeline P and the metal collectors 10A to 10D, and thus it is possible to suppress position deviations of the metal collectors 10A to 10D. In addition, since this filling member 40 is the magnetically permeable material, it does not inhibit the magnetic force circuit formation of each of the metal collectors 10A to 10D. As such magnetically permeable material, it is possible to use a permalloy, a soft iron, a silicon steel, or the like. Incidentally, the filling member 40 as described above can be suitably used in particular to the pipeline P whose outer periphery surface has a big curvature radius (a big diameter) as shown in FIG. 6.

In addition, regarding the second embodiment, an axis body P1 in which the fluid does not pass through is provided at the inside of this pipeline P so as to overlap with the center $P_C$ of the pipeline P. By doing this, it is possible to further surely collect the metal foreign substance in the fluid. In particular, as described above, according to the herein disclosed technique, it is possible to act the magnetism even at a vicinity of the center $P_C$ of the pipeline P. However, compared to the vicinity of the first magnet 11 and the vicinity of the second magnet 12, the magnetism at the center $P_C$ of the pipeline P tends to become weak. On the contrary, in a case where the axis body P1 is arranged at the center $P_C$ of the pipeline P, it is possible to inhibit the fluid from passing through the center $P_C$ of the pipeline P. By doing this, it is possible to further enhance the collection efficiency of the metal foreign substance. Incidentally, it is enough for the axis body P1 to be able to inhibit the fluid from passing through the center $P_C$ of the pipeline P, the axis body is not restricted to the cylindrical member shown in FIG. 6. For example, the axis body might be a member formed in a rod shape (a column shape) which does not include an inside cavity, and might be a member whose cross section is formed in a square shape (a quadrangular prism shape, a triangular prism shape, or the like). This axis body Pl can be suitably used in particular for the pipeline P whose diameter is big. In addition, it is good for the axis body P1 to be arranged on an area where at least the metal collecting apparatus 100A is arranged, in the length direction of the pipeline P (a direction vertical to the paper surface of FIG. 6).

Third Embodiment

In addition, as shown in FIG. 3 and FIG. 6, regarding the metal collecting apparatuses 100, 100A in accordance with the above described embodiments, even numbers (2 or 4) of metal collectors 10 are arranged on the same flat surface. By doing this, it is possible to act the magnetism over the wide range in the pipeline P. However, the metal collecting apparatus disclosed herein is not restricted to the configuration described above. For example, in a case where plural metal collectors are arranged along the length direction of the pipeline P, it is good for respective these plural metal collectors to make the arrangement positions of the first magnets and the arrangements position of the second magnets be different in the circumferential direction. By doing this, even in a case where the number of the metal collector 10 arranged on the same flat surface is 1, it is possible to act the magnetism over the wide range inside the pipeline P.

Figure 7:
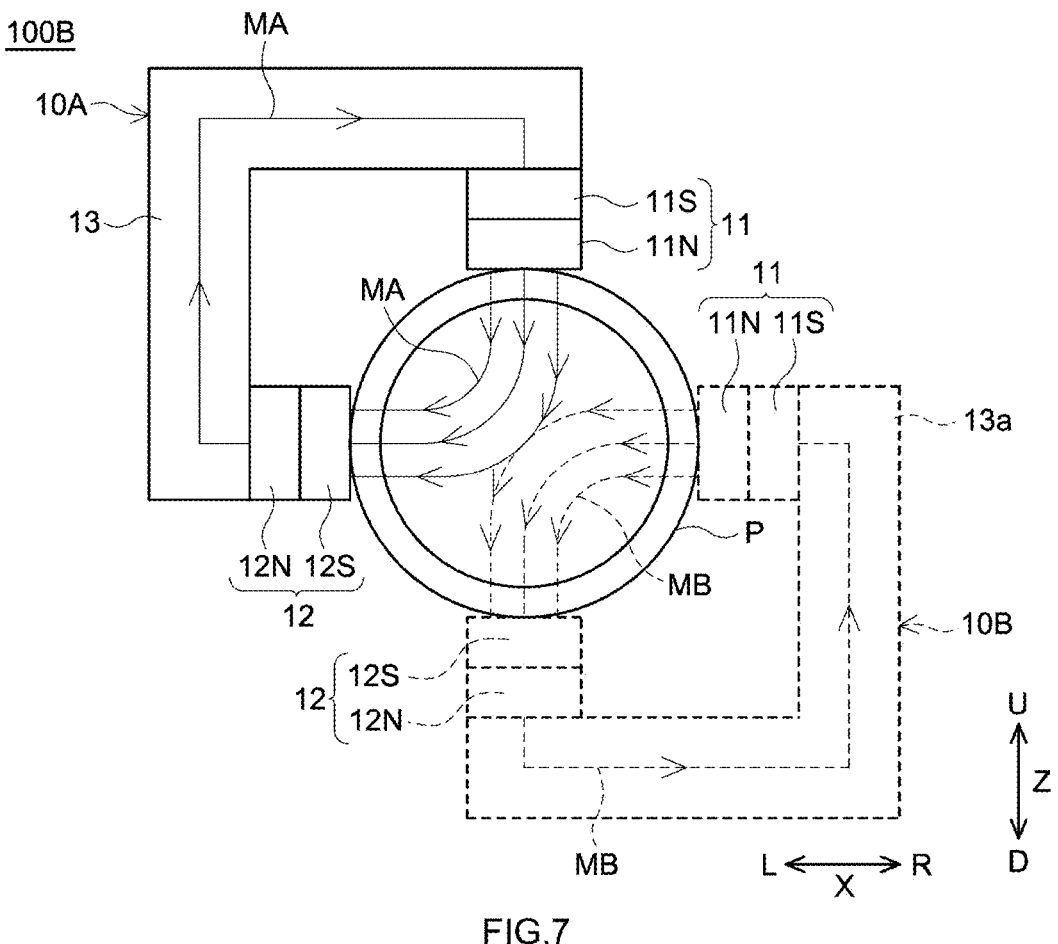
FIG. 7 is a cross section view that schematically shows the metal collecting apparatus for pipeline in accordance with a third embodiment.

For example, FIG. 7 is a cross section view that schematically shows the metal collecting apparatus in accordance with a third embodiment. Incidentally, a dotted line portion in FIG. 7 represents a member arranged at the downstream side more than a solid line portion. Additionally, for convenience sake of explanation, in FIG. 7, the fixing tool is omitted. As shown in this FIG. 7, regarding the metal collecting apparatus 100B in accordance with a third embodiment, between the upstream side metal collector 10A and the downstream side metal collector 10B, the arrangement positions of the first magnets 11 and the arrangement positions of the second magnets 12 are different in the circumferential direction. In accordance with such a configuration, even if the first metal collector 10A and the second metal collector 10B are arranged not on the same flat surface, it is possible to act the magnetism over the wide range in the pipeline P on the cross section view.

Incidentally, as shown in the third embodiment, when the contact position of the metal collectors 10A, 10B at the upstream side of the pipeline P and the contact position of the metal collectors at the downstream side of the pipeline are deviated, it is preferable that the metal collector 10A at the upstream side and the metal collector 10B at the downstream side are arranged to be closer to each other. By doing this, the magnetism tends to easily act on the wide range in the pipeline P, and thus it is possible to exhibit the higher collection efficiency. In particular, the gap between the metal collector 10A at the upstream side and the metal collector 10B at the downstream side is preferably equal to or less than 50 mm, further preferably equal to or less than 20 mm, furthermore preferably equal to or less than 10 mm, or preferably in particular equal to or less than 5 mm.

Additionally, as shown in FIG. 3 and FIG. 6, even in a case where the plural metal collectors are arranged on the same flat surface, the contact position produced by the first magnet and the second magnet might be made to be different between the metal collector at the upstream side and the metal collector at the downstream side. By doing this, it is possible to exhibit the furthermore higher collection efficiency.

Fourth Embodiment

Figure 8:
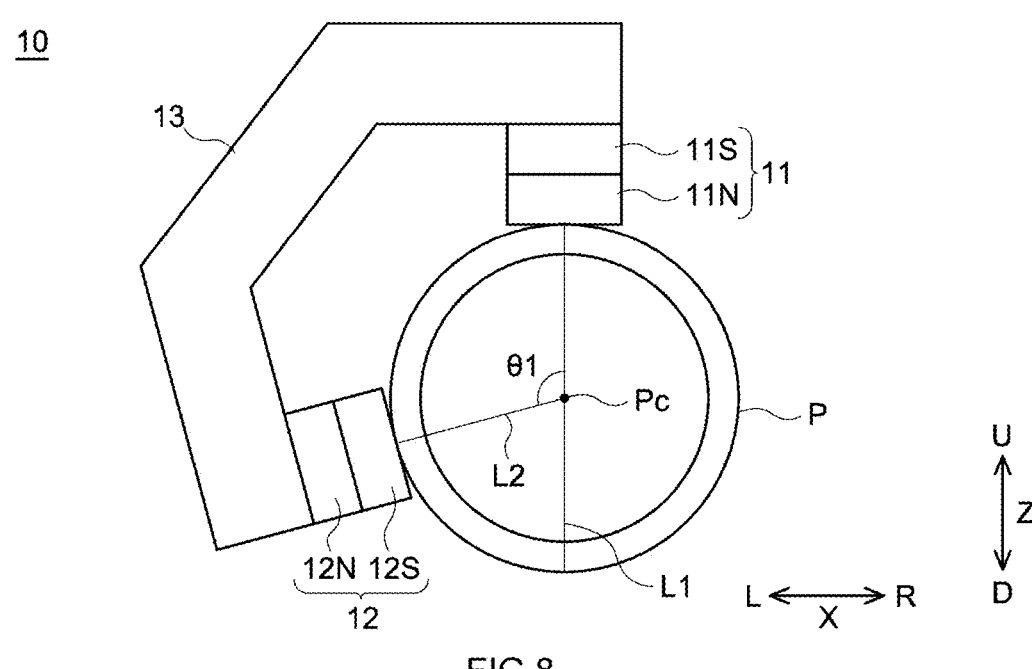
FIG. 8 is a cross section view that schematically shows the metal collector in accordance with a fourth embodiment.

FIG. 8 is a cross section view that schematically shows the metal collector in accordance with a fourth embodiment. As shown in FIGS. 1, 3, 6, and 7, regarding any of the above described metal collectors, the arrangement position of the first magnet 11 and the arrangement position of the second magnet 12 in the circumferential direction are made to be perpendicular) (90°). However, the configuration described above is not intended to restrict the herein disclosed technique. For example, as shown in FIG. 8, a cross angle $\theta 1$ defined by a straight line L1 connecting the first magnet 11 and the center $P_C$ of the pipeline P and a straight line L2 connecting the second magnet 12 and the center $P_C$ of the pipeline P might not be 90°. In that case, it is possible to act the magnetism over the wide range inside the pipeline P, and thus it is possible to suitably remove the metal foreign substance. Incidentally, the cross angle $\theta 1$ defined by the first magnet 11 and the second magnet 12 is preferably equal to or more than 45°, further preferably equal to or more than 60°, furthermore preferably equal to or more than 75°, or preferably in particular equal to or more than 90°. As the cross angle $\theta 1$ becomes larger, the magnetic force line becomes closer to be a linear shape, and thus the magnetic field inside the pipeline P becomes uniform. On the other hand, an upper limit value of the cross angle $\theta 1$ is preferably equal to or less than 180°, further preferably equal to or less than 150°, furthermore preferably equal to or less than 120°, or preferably in particular equal to or less than 90°. As the cross angle $\theta 1$ becomes smaller, the magnetic force line inside the pipeline P becomes a ring shape, and thus it is possible to uniformly form the magnetic field in the pipeline P. Incidentally, in consideration of a balance of the uniformity of the magnetic field and the wideness of the magnetic field, it is preferable similarly to the above described embodiment to make the cross angle $\theta 1$ be about 90° (85° to 95°). By doing this, it is possible to exhibit the further outstanding metal collecting performance.

Fifth Embodiment

Figure 9:
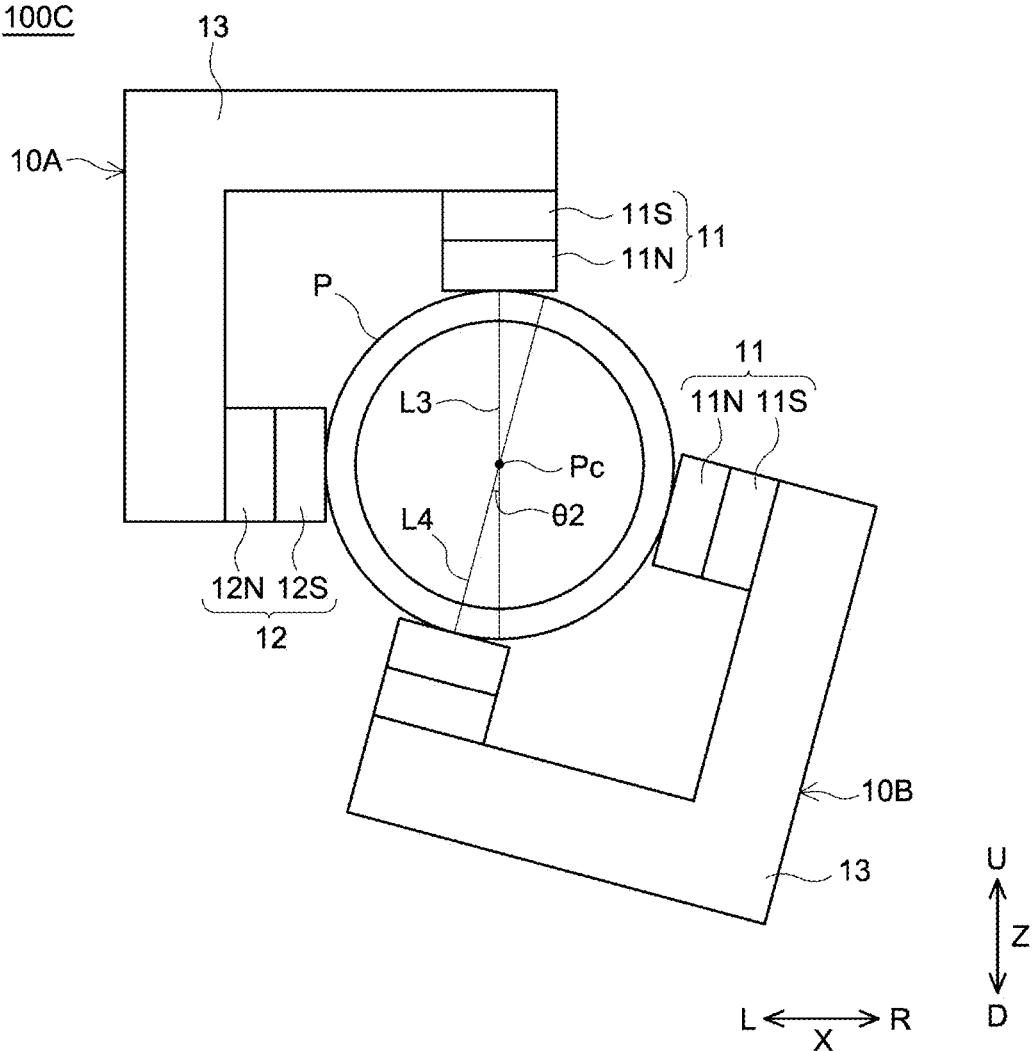
FIG. 9 is a cross section view that is to explain the metal collecting apparatus for pipeline in accordance with a fifth embodiment.

FIG. 9 is a cross section view that is for explaining the metal collecting apparatus for pipeline in accordance with a fifth embodiment. As shown in FIG. 3, regarding the metal collecting apparatus 100 in accordance with the first embodiment, the first magnet 11 of the first metal collector 10A and the second magnet 12 of the second metal collector 10B are arranged to be opposed to each other while sandwiching the pipeline P. However, each arrangement position in a case where the plural metal collectors are attached is not restricted to the position shown in the first embodiment. For example, as shown in FIG. 9, regarding the metal collecting apparatus 100C in accordance with the fifth embodiment, the position of the first magnet 11 of the first metal collector 10A and the position of the second magnet 12 of the second metal collector 10B, which sandwich the pipeline P, are deviated. Even in a case where the configuration described above is applied, it is possible to form the appropriate magnetic force circuit in the pipeline P and to remove the metal foreign substance. In particular, an absolute value of a cross angle $\theta 2$ defined by a straight line L3 connecting the first magnet 11 of the first metal collector 10A and the center $P_C$ of the pipeline P and a straight line L4 connecting the second magnet 12 of the second metal collector 10B and the center $P_C$ of the pipeline P is preferably equal to or less than 45°, further preferably equal to or less than 25°, furthermore preferably equal to or less than 15°, or preferably in particular equal to or less than 5°. Then, in consideration of the uniformity of the magnetic field inside the pipeline P, it is particularly preferable, similarly to the above described embodiment, that the cross angle $\theta 2$ is about 0° (for example, equal to or less than 1°).

Sixth Embodiment

As shown in FIG. 3 and FIG. 6, regarding the above described embodiment, the fixing tool including the rotationally moving member 20 and the locking member 30 is used. However, it is enough for the fixing tool to be able to fix the first magnet 11 and the second magnet 12 on the pipeline P under a state where the N pole 11N of the first magnet 11 and the S pole 12S of the second magnet 12 are directed toward the diameter direction inner side, and thus it is not restricted to the above described structure. For example, the fixing tool shown in FIG. 3 and FIG. 6 includes the locking member 30 that is configured to couple the 2 metal collectors by engaging the notch part 34c and the locking axis 32. However, instead of this locking member 30, it is possible to provide a fastening part that is configured to couple the 2 metal collectors by tightening a screw. For this kind of fastening part, it is possible to suitably apply a configuration of the fastening part of a general pipe coupling. In addition, the fixing tool is not restricted to the fixing tool formed in a clamp shape as shown by FIG. 3 and FIG. 6. For example, in a state where the metal collector is made to come into contact with the pipeline, the fixing tool formed in a belt shape might be wound over this metal collector. Even in a case where the above described configuration is applied, it is possible to fix the first magnet and the second magnet on the pipeline.

Above, the herein disclosed technique has been explained in detail. However, these are merely illustrations, and are not to restrict the scope of claims. The technique recited in claims contains matters in which the above-illustrated specific example is variously deformed or changed. In other words, the herein disclosed technique semantically covers forms recited in item 1 to item 14 described below.

Item 1

1. A metal collector for a pipeline, comprising:
a first magnet arranged on a part of an outer periphery surface of the pipeline in a state where a N pole is directed toward a diameter direction inner side of the pipeline and a S pole is directed toward a diameter direction outer side of the pipeline;
a second magnet arranged on another part of the outer periphery surface of the pipeline in a state where a S pole is directed toward the diameter direction inner side and a N pole is directed toward the diameter direction outer side; and
a magnetic circuit forming member that is a ferromagnetic material connected to the S pole of the first magnet and the N pole of the second magnet.

Item 2

The metal collector recited in item 1, further comprising:
a fixing tool for fixing the first magnet and the second magnet on the pipeline in a state where the N pole of the first magnet and the S pole of the second magnet are directed toward the diameter direction inner side.

Item 3

The metal collector recited in item 1 or 2, wherein
a cross angle θ1 defined by a straight line L1 and a straight line L2 is equal to or more than 45° and not more than 180°,
the straight line L1 connects the first magnet and a center of the pipeline, and
the straight line L2 connects the second magnet and the center of the pipeline.

Item 4

The metal collector recited in any one of items 1 to 3, wherein
a filling member that is a magnetically permeable material having a curved surface along the outer periphery surface of the pipeline is arranged between the N pole of the first magnet and the pipeline and/or between the S pole of the second magnet and the pipeline.

Item 5

A metal collecting apparatus for pipeline comprising a plurality of the metal collectors recited in any one of items 1 to 4.

Item 6

The metal collecting apparatus for pipeline recited in item 5, wherein
even numbers of the metal collectors are arranged on a virtual flat surface crossing an axis line of the pipeline, and
the first magnet of one metal collector of the even numbers of the metal collectors and the first magnet of another metal collector be adjacent to each other in a circumferential direction of the pipeline, and
the second magnet of the one metal collector and the second magnet of the another metal collector be adjacent to each other in a circumferential direction of the pipeline.

Item 7

The metal collecting apparatus for pipeline recited in item 6, wherein
an absolute value of a cross angle θ2 defined by a straight line L3 and a straight line L4 is equal to or less than 45°,
the straight line L3 connects the first magnet of the one metal collector and a center of the pipeline,
the straight line L4 connects the second magnet of the another metal collector and the center of the pipeline.

Item 8

The metal collecting apparatus for pipeline recited in any one of items 5 to 7,
further comprising a fixing tool for fixing the first magnet and the second magnet of each of the even numbers of metal collectors onto the pipeline, in a state where the N pole of the first magnet and the S pole of the second magnet are directed toward the diameter direction inner side, wherein
a plurality of coupling points existed between the metal collectors adjacent to each other in the circumferential direction, and
the fixing tool comprises:
a rotationally moving member coupling the metal collectors being adjacent to each other in a rotatable manner along the virtual flat surface at the coupling points excluding at least one coupling point among the plural of coupling points; and
a locking member configured to engage and disengage the adjacent metal collectors at the coupling point being not coupled by the rotationally moving member.

Item 9

The metal collecting apparatus for pipeline recited in any one of items 5 to 8, wherein
the metal collectors are arranged to be spaced away from each other by a gap along a length direction of the pipeline.

Item 10

The metal collecting apparatus for pipeline recited in item 9, wherein
arrangement positions of the first magnet and the second magnet are different in the circumferential direction of the pipeline, between one metal collector arranged at an upstream side of the length direction and another metal collector arranged at a downstream side more than the arbitrary metal collector.

Item 11

A fluid transferring device, comprising:
a pipeline through which a fluid passes; and the metal collecting apparatus for pipeline recited in any one of items 5 to 10.

Item 12

The fluid transferring device recited in item 11, wherein the fluid is a slurry containing an electrode active material of an electric storage device.

Item 13

The fluid transferring device recited in item 11 or 12, wherein an axis body through which the fluid does not pass is provided at an inside of the pipeline to overlap with the center of the pipeline.

Item 14

A manufacturing apparatus of an electric storage device, comprising the fluid transferring device recited in any one of items 11 to 13.

What is claim is:

1. A manufacturing apparatus of an electric storage device, the manufacturing apparatus comprising:

a backup roller configured to carry an electrode core body formed in a foil shape; and a tank configured to store a slurry containing an electrode active material;

a die head configured to discharge the slurry toward the electrode core body on the backup roller;

a pipeline configured to transfer the slurry from the tank to the die head;

a metal collecting apparatus attached to the pipeline from the tank to the die head; and a valve attached between the die head and the metal collecting apparatus, wherein the metal collecting apparatus includes a plurality of metal collectors, at least one of the plurality of metal collectors comprising:

a first magnet arranged on a part of an outer periphery surface of the pipeline in a state where a N pole of the first magnet is directed toward a diameter direction inner side of the pipeline and a S pole of the first magnet is directed toward a diameter direction outer side of the pipeline;

a second magnet arranged on another part of the outer periphery surface of the pipeline in a state where a S pole of the second magnet is directed toward the diameter direction inner side and a N pole of the second magnet is directed toward the diameter direction outer side; and a magnetic circuit forming member that is a ferromagnetic material connected to the S pole of the first magnet and the N pole of the second magnet, and the manufacturing apparatus further comprises a filling member that is a magnetically permeable material having a curved surface along the outer periphery surface of the pipeline and arranged between the N pole of the first magnet and the pipeline or between the S pole of the second magnet and the pipeline.

2. The manufacturing apparatus according to claim 1, further comprising:

a fixing tool for fixing the first magnet and the second magnet on the pipeline in a state where the N pole of the first magnet and the S pole of the second magnet are directed toward the diameter direction inner side.

3. The manufacturing apparatus according to claim 1, wherein a cross angle $\theta 1$ defined by a straight line L1 and a straight line L2 is equal to or more than 45° and not more than 180°, the straight line L1 connects the first magnet and a center of the pipeline, and the straight line L2 connects the second magnet and the center of the pipeline.

4. The manufacturing apparatus according to claim 1, wherein even numbers of the plurality of metal collectors are arranged on a virtual flat surface crossing an axis line of the pipeline, and the first magnet of one metal collector of the even numbers of the plurality of metal collectors and the first magnet of another metal collector of the even numbers of the plurality of metal collectors are adjacent to each other in a circumferential direction of the pipeline, and the second magnet of the one metal collector and the second magnet of the another metal collector are adjacent to each other in the circumferential direction of the pipeline.

5. The manufacturing apparatus according to claim 4, wherein an absolute value of a cross angle $\theta 2$ defined by a straight line L3 and a straight line L4 is equal to or less than 45°, the straight line L3 connects the first magnet of the one metal collector and a center of the pipeline, the straight line L4 connects the second magnet of the another metal collector and the center of the pipeline.

6. The manufacturing apparatus according to claim 4, further comprising:

a fixing tool for fixing the first magnet and the second magnet of each of the even numbers of the plurality of metal collectors onto the pipeline, in a state where the N pole of the first magnet and the S pole of the second magnet are directed toward the diameter direction inner side, wherein a plurality of coupling points exists between the metal collectors adjacent to each other in the circumferential direction among the plurality of metal collectors, and the fixing tool comprises:

a rotationally moving member coupling the metal collectors being adjacent to each other in a rotatable manner along the virtual flat surface at the coupling points excluding at least one coupling point among the plurality of coupling points; and a locking member configured to engage and disengage the adjacent metal collectors at the coupling point being not coupled by the rotationally moving member.

7. The manufacturing apparatus according to claim 1, wherein the plurality of metal collectors is arranged to be spaced away from each other by a gap along a length direction of the pipeline.

8. The manufacturing apparatus according to claim 7, wherein arrangement positions of the first magnet and the second magnet are different in a circumferential direction of the pipeline, between one metal collector of the plurality of metal collectors arranged at an upstream side of the length direction and another metal collector of the plurality of metal collectors arranged at a downstream side more than an arbitrary metal collector of the plurality of metal collectors.

9. The manufacturing apparatus according to claim 1, wherein an axis body through which a fluid does not pass is provided at an inside of the pipeline to overlap with a center of the pipeline.

10. A manufacturing apparatus of an electric storage device, the manufacturing apparatus comprising:

a backup roller configured to carry an electrode core body formed in a foil shape; and a tank configured to store a slurry containing an electrode active material;

a die head configured to discharge the slurry toward the electrode core body on the backup roller;

a pipeline configured to transfer the slurry from the tank to the die head;

a metal collecting apparatus attached to the pipeline from the tank to the die head; and a valve attached between the die head and the metal collecting apparatus, wherein the metal collecting apparatus includes a plurality of metal collectors, at least one of the plurality of metal collectors comprising:

a first magnet arranged on a part of an outer periphery surface of the pipeline in a state where a N pole of the first magnet is directed toward a diameter direction inner side of the pipeline and a S pole of the first magnet is directed toward a diameter direction outer side of the pipeline;

a second magnet arranged on another part of the outer periphery surface of the pipeline in a state where a S pole of the second magnet is directed toward the diameter direction inner side and a N pole of the second magnet is directed toward the diameter direction outer side; and a magnetic circuit forming member that is a ferromagnetic material connected to the S pole of the first magnet and the N pole of the second magnet, even numbers of the plurality of metal collectors are arranged on a virtual flat surface crossing an axis line of the pipeline, the first magnet of one metal collector of the even numbers of the plurality of metal collectors and the first magnet of another metal collector of the even numbers of the plurality of metal collectors are adjacent to each other in a circumferential direction of the pipeline, the second magnet of the one metal collector and the second magnet of the another metal collector are adjacent to each other in the circumferential direction of the pipeline, the manufacturing apparatus further comprises a fixing tool for fixing the first magnet and the second magnet of each of the even numbers of the plurality of metal collectors onto the pipeline, in a state where the N pole of the first magnet and the S pole of the second magnet are directed toward the diameter direction inner side, a plurality of coupling points exists between the metal collectors adjacent to each other in the circumferential direction among the plurality of metal collectors, and the fixing tool comprises:

a rotationally moving member coupling the metal collectors being adjacent to each other in a rotatable manner along the virtual flat surface at the coupling points excluding at least one coupling point among the plurality of coupling points; and a locking member configured to engage and disengage the adjacent metal collectors at the coupling point being not coupled by the rotationally moving member.

11. A manufacturing apparatus of an electric storage device, the manufacturing apparatus comprising:

a backup roller configured to carry an electrode core body formed in a foil shape; and a tank configured to store a slurry containing an electrode active material;

a die head configured to discharge the slurry toward the electrode core body on the backup roller;

a pipeline configured to transfer the slurry from the tank to the die head;

a metal collecting apparatus attached to the pipeline from the tank to the die head; and a valve attached between the die head and the metal collecting apparatus, wherein the metal collecting apparatus includes a plurality of metal collectors, at least one of the plurality of metal collectors comprising:

a first magnet arranged on a part of an outer periphery surface of the pipeline in a state where a N pole of the first magnet is directed toward a diameter direction inner side of the pipeline and a S pole of the first magnet is directed toward a diameter direction outer side of the pipeline;

a second magnet arranged on another part of the outer periphery surface of the pipeline in a state where a S pole of the second magnet is directed toward the diameter direction inner side and a N pole of the second magnet is directed toward the diameter direction outer side; and a magnetic circuit forming member that is a ferromagnetic material connected to the S pole of the first magnet and the N pole of the second magnet, the plurality of metal collectors is arranged to be spaced away from each other by a gap along a length direction of the pipeline, and arrangement positions of the first magnet and the second magnet are different in a circumferential direction of the pipeline, between one metal collector of the plurality of metal collectors arranged at an upstream side of the length direction and another metal collector of the plurality of metal collectors arranged at a downstream side more than an arbitrary metal collector of the plurality of metal collectors.

* * * * *